United States Patent
Townend et al.

(10) Patent No.: US 6,959,204 B1
(45) Date of Patent: Oct. 25, 2005

(54) TELEPHONE EQUIPMENT

(75) Inventors: Jonathan R Townend, Ipswich (GB); Stephen J Buttery, Colchester (GB)

(73) Assignee: British Telecommunications, London (GB)

( * ) Notice: Subject to any disclaimer, the term of this patent is extended or adjusted under 35 U.S.C. 154(b) by 0 days.

(21) Appl. No.: 09/959,956

(22) PCT Filed: May 22, 2000

(86) PCT No.: PCT/BG00/01956

§ 371 (c)(1),
(2), (4) Date: Nov. 13, 2001

(87) PCT Pub. No.: WO00/76238

PCT Pub. Date: Dec. 14, 2000

(30) Foreign Application Priority Data

Jun. 9, 1999 (EP) .................................. 99304504

(51) Int. Cl.⁷ ............................................. H04B 1/38
(52) U.S. Cl. .................... 455/557; 455/419; 455/420
(58) Field of Search ............................... 455/557, 569, 455/556, 568, 420, 419, 517; 379/93.02, 379/93.03

(56) References Cited

U.S. PATENT DOCUMENTS 5,802,467 A * 9/1998 Salazar et al. .............. 455/420

FOREIGN PATENT DOCUMENTS

| JP | 10-174009 | * 6/1998 | ............ H04N 5/44 |
| WO | WO 98/59508 | 12/1998 | |

* cited by examiner

*Primary Examiner*—Melur Ramakrishnaiah
(74) *Attorney, Agent, or Firm*—Nixon & Vanderhye P.C.

(57) ABSTRACT

An interface device allows communication between a first telephone terminal, a second, wireless telephone terminal, and a telephone network. The device includes a transceiver for transmitting and receiving wireless signals to and from the wireless terminal, the wireless signals including authentication data identifying the terminal, such as the data carried by a SIM card. A data processor processes the authentication data. The processed authentication data can be transmitted to the fixed network. The first telephone terminal is connected to the interface such that communication between the first terminal and the network can be enabled by the authentication data received from the wireless telephone terminal. The wireless signals may be carried over an "ad hoc piconet" system.

18 Claims, 3 Drawing Sheets

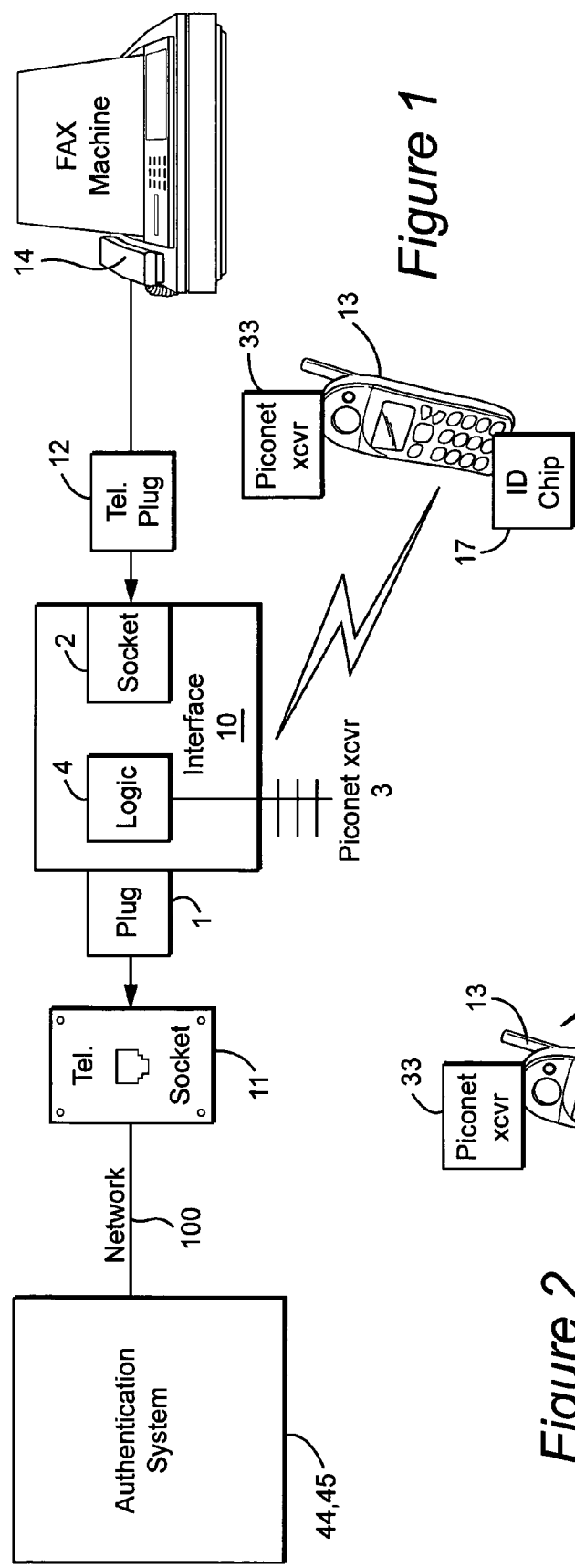

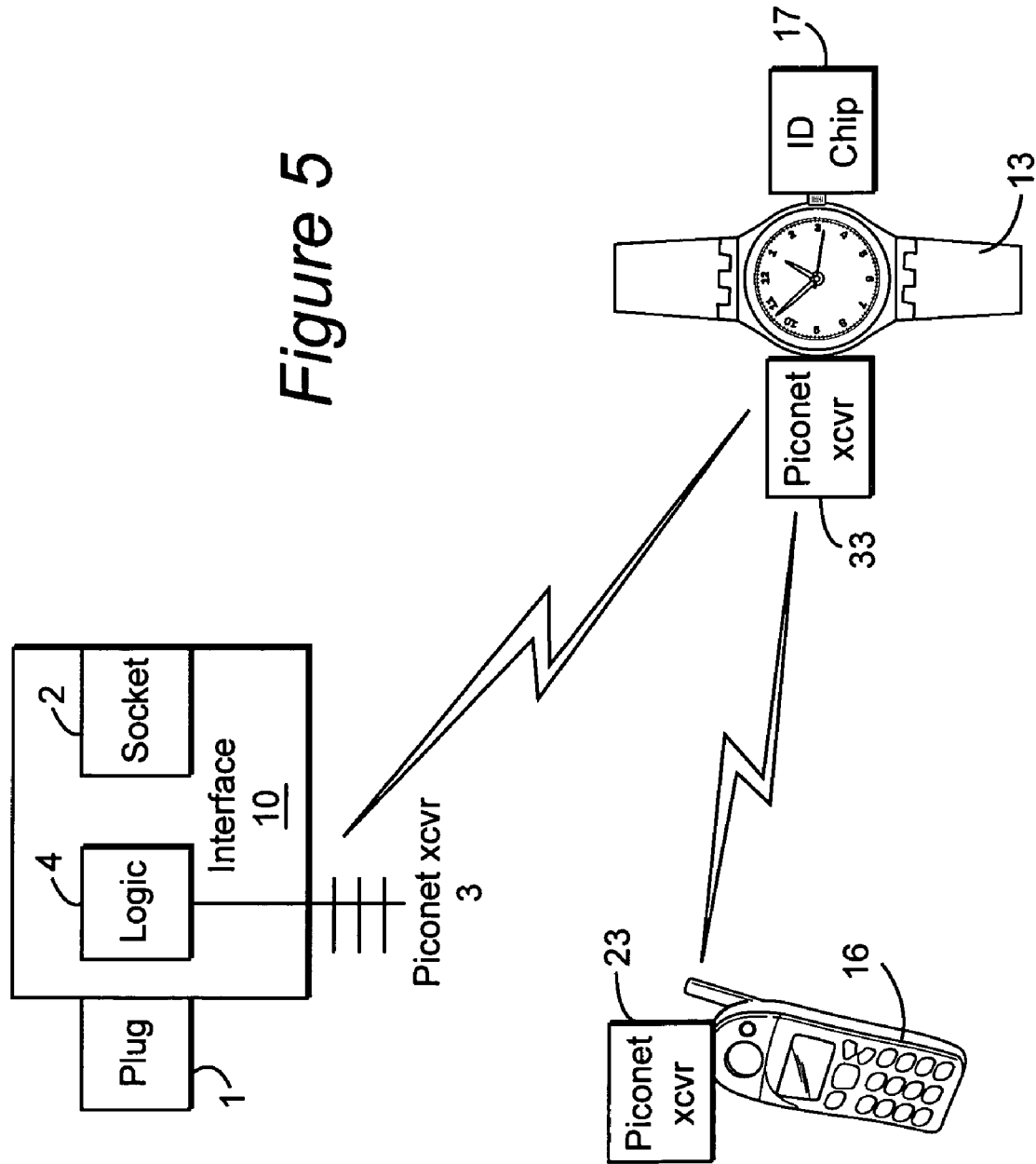

TELEPHONE EQUIPMENT

BACKGROUND OF THE INVENTION

1. Field of the Invention

This invention relates to telephone equipment, and more particularly to user terminals that communicate with a telephone network by way of a wireless interface, using radio or other means.

2. Related Art

As is well known, such systems allow the user to take the terminal from one place to another and remain in contact with the network, a facility generally referred to as "mobility". However, mobility facilities can also be provided on a fixed, or "wired" network by arranging the system such that the user may access the network using any one of its wired network termination points.

To perform mobility services in any network, the network must be aware of the identity of the user when contact is first made. In mobile networks according to standards such as GSM, the identity of the user is stored on a smart card (SIM Card) in the terminal, and this communicates with the network via the terminal. The user is thus identified as currently using a specified mobile terminal, which is in communication with the network through a specified fixed radio base station. In a fixed-wire network, the user identification is either done by keypad entry (protected by PIN numbers), or by a voice-controlled system that the user dials into, or by physically inserting a card or other identification means into the wired terminal.

For a number of reasons, users wish to have the choice of whether to use a wireless user terminal or a fixed-wire terminal. Wireless terminals can be used in situations where no fixed terminal is available, for example in a moving vehicle, but many users prefer to use fixed terminals when they are available. Mobile terminals generally have higher call tariffs, are dependent on battery power, and have ergonomic constraints caused by their limited size, such as the number and size of keys on the keypad. Indeed, some terminal types, in particular facsimile machines, are too bulky to be suitable for use as mobile terminals, and others, such as high bandwidth devices like video systems, are unsuitable for the relatively low bandwidth available over a cellular radio connection. Many users therefore have both a fixed line identity (which may allow mobility between fixed line terminals) and a cellular identity.

It is desirable to have a uniform means by which a user can be identified to the network through any type of terminal. It would be possible to devise fixed-wire terminals which accept GSM smart cards (SIMs). However, these cards have to be very small to allow their use in portable mobile terminals. The frequent transfer of such cards from one terminal to another is inconvenient, and there is a serious risk of losing or damaging the cards in such transfers.

The proposed short-range radio interface system developed under the Trade Mark "Bluetooth" is designed for interconnecting such items as mobile telephones and laptop computers, or printers and PCs, and is described in Ericsson Review No 3, 1998, Jaap Haartsen, "*BLUETOOTH—The universal radio interface for ad hoc, wireless connectivity*". It is a radio interface using the 2.45 GHz frequency band designed to allow suitably equipped portable electronic devices to connect and communicate wirelessly via short-range ad hoc networks. Such networks are known, in that article and also in this specification as "piconets". Each unit can simultaneously communicate with several other units. The system allows wireless communication between mobile telephones, computers, headsets and any other device suitably equipped. However, most existing telephone terminal equipment is not so equipped.

Existing piconet connections for mobile telephones are provided to allow interaction between a remote user interface and the user-controlled parts of the mobile interface, for example to allow hands-free operation or downloading of data to the telephone for onward transmission.

BRIEF SUMMARY OF THE INVENTION

According to an exemplary embodiment of the invention there is provided an interface device for allowing communication between a first telephone terminal, a second, wireless, telephone terminal, and a fixed telephone network, the device comprising a transceiver for transmitting and receiving wireless signals to and from the wireless terminal, the wireless signals including authentication data identifying the wireless terminal, data processing means for processing the authentication data, telephone network interface means for transmitting the processed authentication data to the fixed network, and terminal connection means for connecting the first telephone terminal to the interface means, communication between the first terminal and the fixed network being enabled by the authentication data received from the wireless telephone terminal.

According to a second aspect there is provided a wireless telephone terminal device having terminal identification means, the terminal identification means being capable of generating authentication data, the wireless telephone device having means for transmission of said authentication data to an associated communications device to enable operation of said associated communications device.

The terminal may be a cellular telephone, arranged to enable operation of an associated interface device of the kind defined above. Alternatively, it may be a separate unit which can enable operation both of an associated cellular telephone and of other associated devices such as the interface device defined abobve.

The wireless signals may use any suitable wireless system such as IrDA (Infra Red Data Acquisition), wireless local area network (WLAN) or the proposed "Bluetooth" piconet radio system already discussed.

This arrangement achieves all of the benefits of using the SIM card from the mobile network (commonality of services, one number, good authentication possibilities etc), but without the handling problems of having to remove a very small device from the mobile unit, and placing it in the fixed terminal. It also allows the use of standard fixed terminals, not equipped to receive authentication cards or wireless signals. Note that, in this context, the fixed terminal can be any network device, ranging from a simple telephone all the way up to a network-connected PC. The fixed network may be a conventional wired system, a Local Area Network (LAN), or a fixed wireless system, such as a microwave link or a wireless LAN.

BRIEF DESCRIPTION OF THE DRAWINGS

An embodiment of the invention will now be described, by way of example, with reference to the Figures in which FIG. 1 shows the general arrangement of one embodiment of the interface device, together with devices between which it provides an interface FIG. 2 shows the general arrangement of another embodiment of the interface device, together with devices between which it provides an interface

FIG. 5 illustrates a variation on the embodiment of FIG. 1

DETAILED DESCRIPTION OF EXEMPLARY EMBODIMENTS

Figure 3:
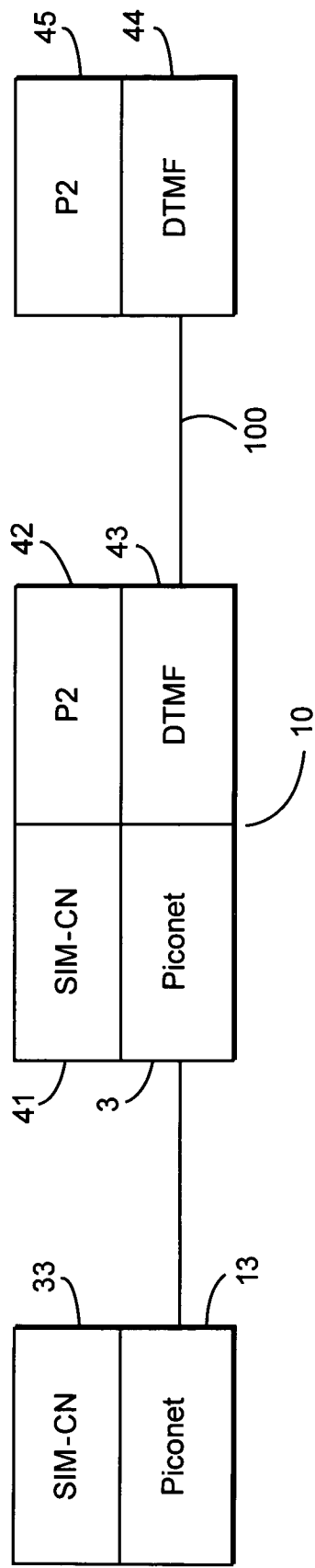
FIGS. 3 and 4 illustrate suitable interface protocol systems for the embodiments of FIGS. 1 and 2

The embodiments are based on the "Bluetooth" piconet system already mentioned, although the invention is not limited to such a system. Various features of the Bluetooth system, such as local authentication and security, might need to be incorporated separately if other systems are used.

FIG. 1 shows an interface device 10, which comprises a plug 1 for connection to a telephone socket 11 connected to a telephone network 100, a socket 2 for connection to a standard telephone plug connection 12, and a piconet transceiver 3 for wireless communication with other piconet transceivers 33, provided in devices such as a cellular telephone 13. The three connection points 1, 2, 3 in the interface device 10 are interconnected by control logic 4, to be described later, to allow signals received over the piconet connection 3, 33 to be translated into signals transmittable over the telephone network 100, and vice versa, and to allow connection between the network 100 and the device 14 (for example a facsimile machine) to which the plug 12 is fitted. The plug 1 and socket 2 may each be of any suitable type, for connection to a standard PSTN (Public Switched Telephone Network), ISDN (Integrated Services Digital Network), ADSL (Asymmetric Digital Subscriber Line), HDSL (High rate Digital Subscriber Line), VDSL (Very high rate Digital Subscriber line), SDSL (Single Digital Subscriber Line) (these last four collectively known as xDSL), or any other suitable connection, for connection with suitable sockets 11 and plug connections 12. The plug 1 is not necessarily of the same type as those compatible with the socket 2. For example, the plug 1 may be of ISDN type and the socket 2 of PSTN type, to allow the interface device to act as an adapter to connect a PSTN-compatible terminal 14, through suitable interface systems in the interface device 10, to an ISDN connection 11, 100.

The cellular telephone 13 has an associated user identity carried on a chip 17.

In the arrangement illustrated in FIG. 2, the transceiver 3 and control logic 4 may be integrated into a device 24, for example a computer, which is fitted with a means for access to the fixed network 100, such as a modem connection 20. This allows the device 24, and any peripherals connected to it, to have access to the network 100 using the identity of the SIM in the cellular telephone 13.

In the embodiments of FIGS. 1 and 2 the cellular telephone 13 effectively acts simply as a "SIM holder", avoiding the need to transfer the SIM to the terminal 14, 24 which the user wishes to use. The piconet transceiver 33 in the cellular telephone 13 is arranged to allow transfer of data from the SIM over the piconet. Piconet connections to cellular telephones are already known for operation of hands-free handsets, and the like. The terminal identification means 17 may be connected through the same piconet connection, or a separate one 33 may be provided.

As shown in FIG. 5, the SIM 17 may instead be located in some device 13 other than a cellular telephone 16, for example an object carried on the person such as a wristwatch or an item of jewellery. The wearable item 13 is equipped with a piconet transceiver 33. In this case the SIM holder 13 may be connected using the piconet either to the cellular telephone 16, itself equipped with a piconet transceiver 23, or, by means of the interface unit 10, to a fixed terminal 14, depending on the current location of the user. This avoids the user having to find the cellular telephone 16 in order to use the fixed terminal 14, and also assists in security of the cellular telephone since without the wearable device 13 the cellular telephone 16 is unusable.

The piconet transceiver 3 is used to allow the SIM card to communicate with the network, allowing the user access to the network 100. The terminal 14, 24 can then be used to communicate with the network 100, using the subscription identity associated with the SIM contained within the cellular telephone 13. It is envisaged that the use of a SIM identity on a fixed line would attract a lower tariff than conventional cellular connection over a radio interface.

FIG. 3 shows protocol stacks implemented in the control logic 4 of the interface unit 10, the cellular telephone 13 and the network 100. The system may be used with any type of fixed connection, but is illustratively shown for a PSTN system. The cellular telephone 13 formats SIM data into a piconet-compatible protocol (for example, the "Bluetooth" protocol) in which form it is transmitted over the piconet interface 33, 3 to the interface element 1. This extracts the SIM identity from the piconet transmission (41), and converts this identity into a user code (42) recognisable by a PSTN switch as giving authority to use the system. This code is translated for transmission over the voice band of the telephone network 100. For a conventional PSTN (Public Switched Telephone Network) connection the interface could incorporate a DTMF dialler (43), which converts the user ID received from the SIM 17 to DTMF tones for transmission to an authentication system (44, 45) in the network, which converts the PSTN codes 43 back to the user code 42. The interface 1 also provides the necessary facilities to transmit signals back to the SIM.

Figure 4:
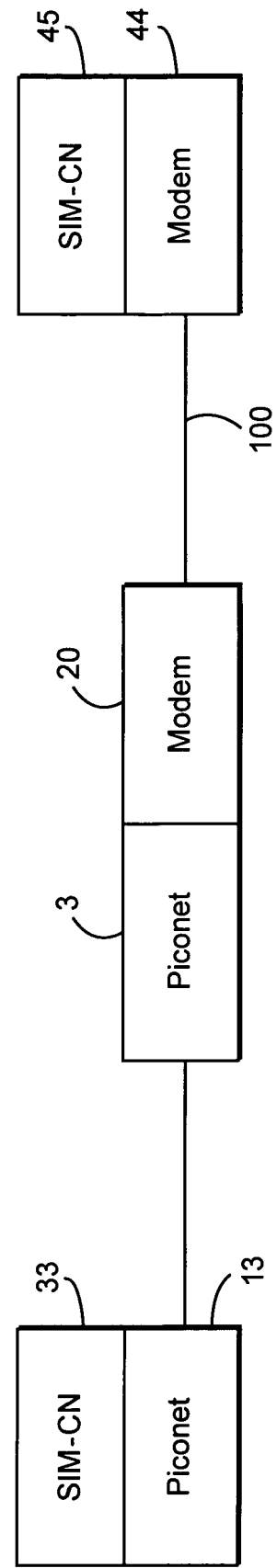

In an alternative arrangement, shown in FIGS. 2 and 4, the interface unit can be incorporated in a terminal device 24 such as a computer, the interface to the fixed network using a piconet-fitted modem 20, the signalling taking place directly between the SIM 17 and the network 100 using the modem 20 to translate the piconet protocols to modem format.

For data systems such as ISDN (Integrated Services Data Network), an Access Point with an ISDN connection could use direct digital communications via the B or D channel.

An Access Point with an xDSL connection could use any appropriate protocol (e.g. IP or X.25).

The intelligent entity 44, 45 to which the devices are communicating could reside within the network 100, within another network, or at another network termination.

The user's telephone connection to the network 100 is used both for signalling (with the SIM in the mobile unit 13 via the Interface unit 10) and for traffic (from the wired phone 14, or a computer 24 via a modem 22).

The user can use the mobile terminal 13 in the usual way, but the wired terminal 14 can be used when one is available. At such times the mobile terminal 13 is only used for holding the SIM.

The protocols supported by the SIM are already standardised in GSM in order to connect the terminal/network to the SIM.

The proposed Bluetooth piconet interface includes a certain amount of security. However, a further encryption layer could be added between the network and the Interface unit 10.

What is claimed is:

1. An interface device for allowing data communication between a first telephone terminal, a second, wireless, telephone terminal, and a fixed telephone network, the device comprising:
   a transceiver for transmitting and receiving wireless signals to and from the wireless terminal,
   the wireless signals including authentication data identifying the wireless terminal,
   a data processor for processing the authentication data,
   a telephone network interface for transmitting the processed authentication data to the fixed network, and
   a terminal connection for connecting the first telephone terminal to the interface,
   communication between the first telephone terminal and the fixed network being enabled by the authentication data received from the wireless telephone terminal.

2. An interface device as in claim 1, the telephone network interface comprising means for a connection for a standard PSTN (public switched telephone network).

3. An interface device as in claim 1, the telephone network interface comprising a connection for an ISDN (integrated services digital network).

4. An interface device as in claim 1, the telephone network interface comprising a connection for an xDSL digital subscriber line system.

5. An interface device as in claim 1, incorporated in a first terminal, the terminal connection providing access to a telephone network through the telephone network interface.

6. An interface device as in claim 1, the terminal connection being arranged to connect to a terminal fitted for connection to a standard PSTN (public switched telephone network).

7. An interface device as in claim 1, the terminal connection being arranged to connect a terminal fitted for connection to an ISDN (integrated services digital network).

8. An interface device as in claim 1, the terminal connection being arranged to connect to a terminal fitted for connection to an xDSL digital subscriber line system.

9. An arrangement of a wireless telephone terminal device and an interface device, the interface device being as in claim 1 and the wireless telephone terminal device having a terminal identifier capable of generating authentication data, the wireless telephone device having a transmitter for transmission of said authentication data to an associated communications device to enable operation of said associated communications device and arranged to communicate with each other by wireless signals.

10. A device or arrangement of devices as in claim 9, wherein the wireless signals include IrDA (Infra Red Data Acquisition) signals.

11. A device or combination as in claim 9, wherein the wireless signals are carried over a wireless local area network (WLAN).

12. A device or combination as in claim 9, wherein the wireless signals use a piconet radio system.

13. A device or arrangement of devices as in claim 1, wherein the wireless signals include IrDA (Infra Red Data Acquisition) signals.

14. A device or combination as in claim 1, wherein the wireless signals are carried over a wireless local area network (WLAN).

15. A device or combination as in claim 1, wherein the wireless signals use a piconet radio system.

16. An interface method for allowing data communication between a first telephone terminal, a second, wireless, telephone terminal, and a fixed telephone network, the method comprising:
   transmitting and receiving wireless signals to and from the wireless terminal, the wireless signals including authentication data identifying the wireless terminal, processing the authentication data, transmitting the processed authentication data to the fixed network through an interface, and
   connecting the first telephone terminal to the interface,
   communication between the first telephone terminal and the fixed network being enabled by the authentication data received from the wireless telephone terminal.

17. A method as in claim 16 being conducted in a first terminal, the terminal connection providing access to a telephone network through the telephone network interface.

18. A method as in claim 16 wherein the wireless telephone terminal includes a terminal identifier capable of generating authentication data, the wireless telephone device having a transmitter for transmission of said authentication data to an associated communications device to enable operation of said associated communications device and arranged to communicate with each other by wireless signals.

* * * * *